F. STURDY.
POCKET FOR COATS OR OTHER GARMENTS.
APPLICATION FILED JULY 5, 1916.

1,308,999.

Patented July 8, 1919.
3 SHEETS—SHEET 1.

Inventor:
Fred Sturdy
by Sngere, Cenelman &c
Attys

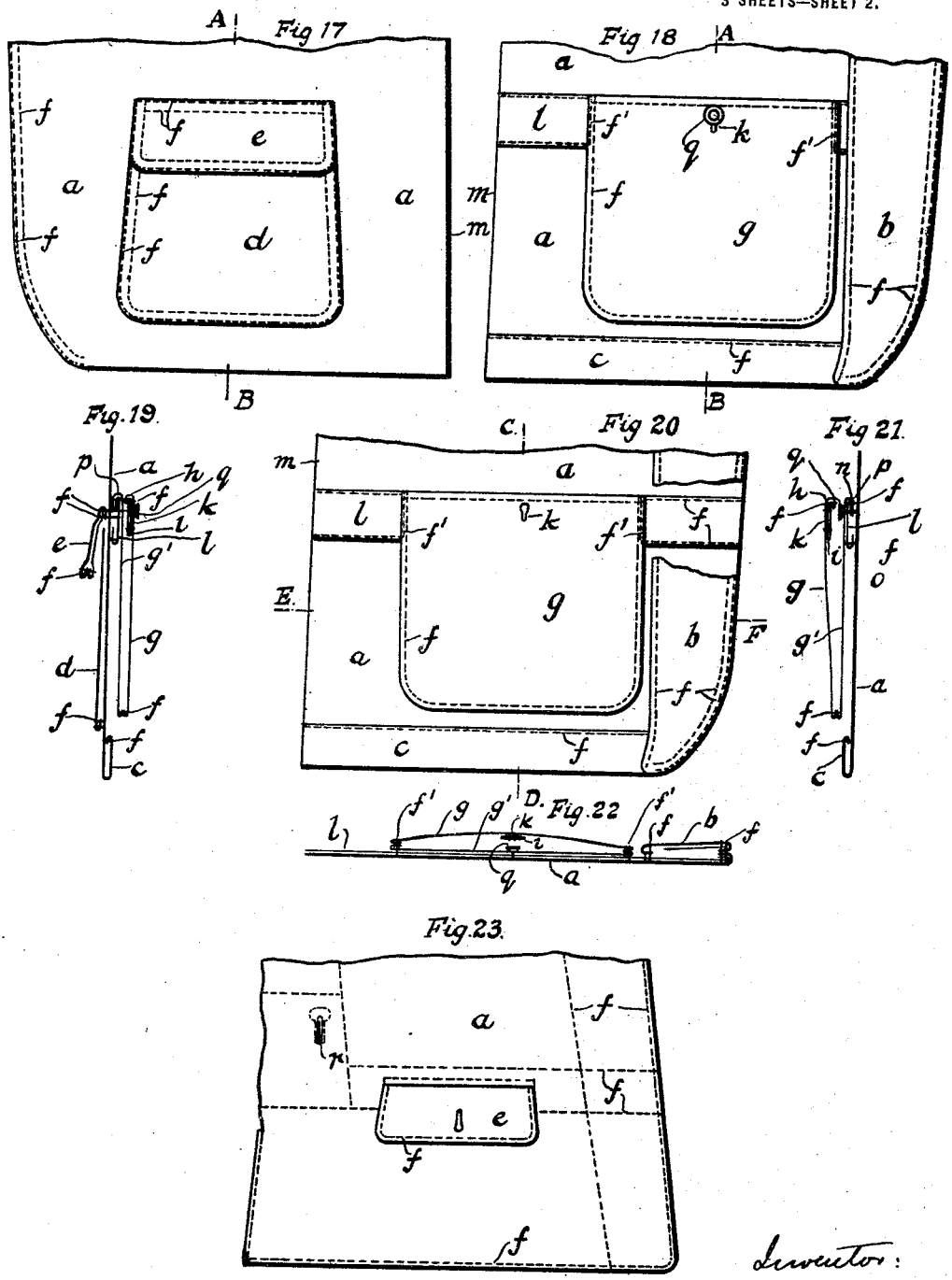

F. STURDY.
POCKET FOR COATS OR OTHER GARMENTS.
APPLICATION FILED JULY 5, 1916.
1,308,999.
Patented July 8, 1919.
3 SHEETS—SHEET 3.
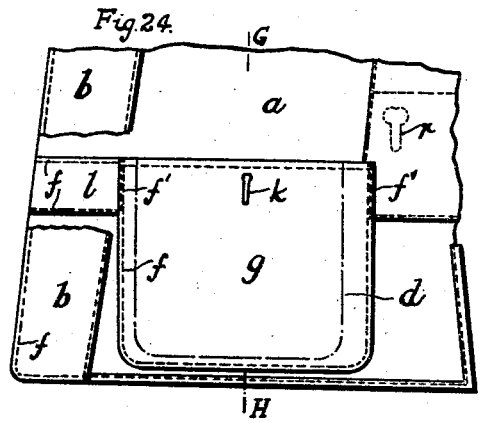
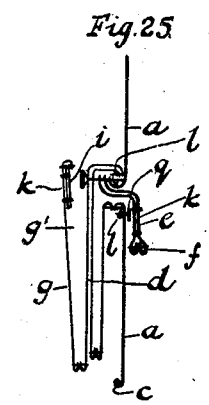
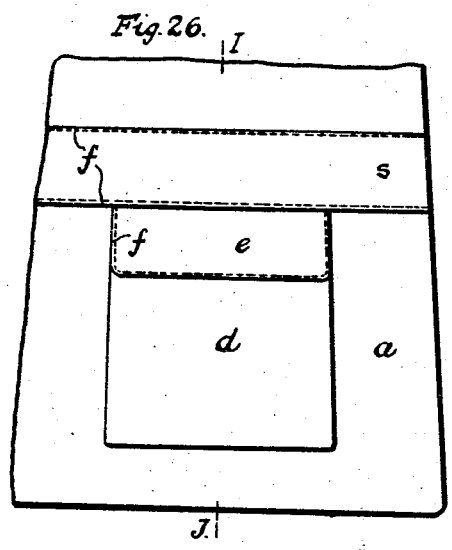
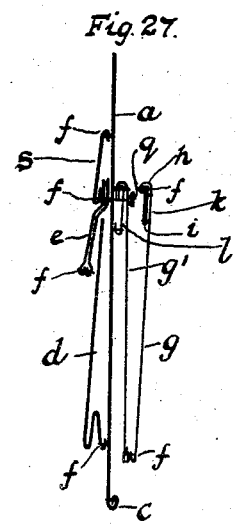
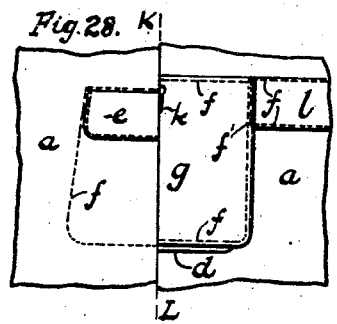
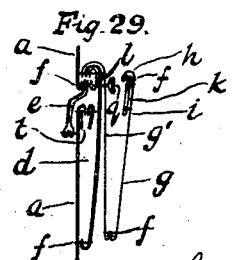

UNITED STATES PATENT OFFICE.

FRED STURDY, OF LEEDS, ENGLAND, ASSIGNOR OF ONE-HALF TO WILLIAM MITCHELL, OF HORSFORTH, ENGLAND.

POCKET FOR COATS OR OTHER GARMENTS.

1,308,999.  Specification of Letters Patent.  Patented July 8, 1919.

Application filed July 5, 1916. Serial No. 107,560.

*To all whom it may concern:*

Be it known that I, FRED STURDY, residing at 1 Marion Mount, Leeds, in the county of York, England, have invented new and useful Improvements in or Relating to Pockets for Coats or other Garments, of which the following is a specification.

This invention relates to improvements in pockets for unlined garments, and is particularly applicable for army tunics and coats, but it may also be used with ordinary coats, overcoats, tunics and the like for male and female wear.

Methods of attaching pockets to garments with linings are known in which a horizontally placed stay or reinforcing-strip or facing is formed by one or more pieces of fabric being folded and sewn along their edges with or without lines of cross or vertical stitching to keep them in position. The stay or strip is first sewn to the outer side of the garment with one or two lines of stitches, and a cut is then made in the fabric of the garment to form the pocket opening. The stay or strip is passed through the slit and the ends of the pocket are attached to the strip or strips. In other cases after the stay has been cut the flap of the pocket has been sewn on the inside of the garment and passed through the slit and one or both of its edges are swelled or corded; the pocket being attached to the inside portions above and below the slit. Pockets have also been provided with plaits or folds for relieving the lower edge of undue strain.

The object of this invention is to provide the coat, tunic, or other garment with one or two "bagged" pockets on the inside of its fronts as may be required, either alone or in addition to the usual outside or "patch" pocket, or the ordinary inside pocket.

The invention consists in the details of the construction herein described and claimed.

According to this invention the coat or tunic, or other garment,—hereinafter termed and included in the term "garment,"—is provided with ordinary inside or outside pockets fixed thereto or therein in the usual manner. On the inside of the garment is fixed a horizontal stay, which extends from the front facing to the side seam, made of any suitable woven textile fabric. The stay is sewn or felled on its lower edge at a suitable distance from the arm holes of the garment and it extends wholly across each front portion of the same so that its ends are respectively secured under the said facing and in one of the side seams. The pockets are what are known as "bagged" pockets, that is, they are first sewn or stitched with their face inward and after being turned outward are again stitched around them leaving the upper horizontal portion open to form the mouth of the pocket. The upper edge of the second pocket is then turned under the upper edge of the stay and stitched or felled across for securing the stay in position. In order to strengthen the pocket each of its vertical sides is felled down from the upper edge for the width of the stay. The stay also strengthens and assists in securing the ordinary pocket in position.

In the drawings hereunto annexed are shown a variety of ways of applying the invention, in which—

Figure 1 is a diagram of a blank for forming the second pocket, which pocket is frequently known in England as a "hare" pocket;

Fig. 2 a button-hole strengthener blank;

Fig. 3 an elevation of the blank shown at Fig. 2 with the vertical edges turned in;

Fig. 4 an end elevation of the same;

Fig. 5 a plan of Fig. 3;

Fig. 6 an elevation of Fig. 3 folded;

Fig. 7 an end elevation of the same;

Fig. 8 an elevation of the second pocket stitched together with the top edge of one of the blanks turned over and the button-hole strengthener in position;

Fig. 9 a sectional elevation of the same;

Figure 12:
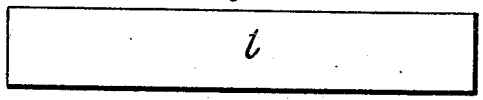
Figure 13:
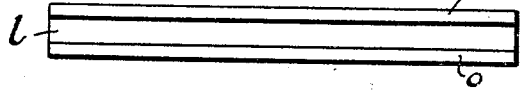
Figure 14:
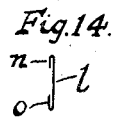
Figure 15:
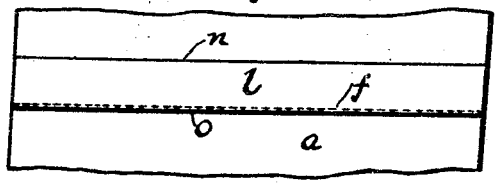
Figure 16:
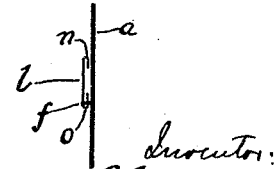

Fig. 12 an elevation of the strengthening blank;

Fig. 13 an elevation showing the said blank turned over on each of its longitudinal edges;

Fig. 14 an end elevation of same;

Fig. 15 an elevation showing the strengthening piece sewn by its lower edge on to a portion of a garment;

Fig. 16 a sectional elevation of the same;

Fig. 17 an outside elevation of a garment with an outer patch pocket applied thereto;

Fig. 18 an inside elevation of a portion of a garment with the additional pocket and the strengthening strip applied thereto;

Fig. 19 a sectional elevation on line A, B, Figs. 17 and 18;

Fig. 20 an elevation of the inside of a garment with the second pocket only applied thereto;

Fig. 21 a sectional elevation on line C, D, Fig. 20;

Fig. 22 a sectional plan on line E, F, Fig. 20;

Fig. 23 an elevation of the outside portion of an ordinary army tunic;

Fig. 24 an elevation of the inside portion of the same tunic with the second pocket applied thereto;

Fig. 25 a sectional elevation on line G, H, Fig. 24;

Fig. 26 is a part outside elevation of an officer's tunic with the ordinary bellows pocket and flap applied thereto;

Fig. 27 a sectional elevation on line I, J, Fig. 26 showing the application of the second and inside pocket applied thereto;

Fig. 28 a part elevation of the outside and inside of a garment having both the patch pocket and the second or hare pocket on the inside of the garment;

Fig. 29 a sectional elevation on line K, L, Fig. 28.

Like parts in all the views are marked with similar letters of reference.

$a$ is the lower portion of the garment, $b$ its vertical facing, $c$ the turned up hem, $d$ the ordinary pocket, which, in some cases, is fixed to the outside of the garment in the form of a patch, and in other cases it may either take the form of a patch or an ordinary pocket which is fixed to the inner and unlined portion of the garment. $e$ is the lined or unlined flap for covering the pocket on its outer side. When the pocket $d$ is employed for an officer's tunic it is made, as usual, in what is known in the trade as a "bellows" pocket form.

All the above parts are of the usual and ordinary construction, and therefore will be readily understood without further explanation.

In the drawings hereunto annexed the dotted lines in all the views represent rows of stitchings, and they are marked as $f$.

In the sectional views of the drawings the several portions of the garments are shown, for the sake of clearly illustrating the construction, at distances apart, but it will readily be understood that in the actual article these parts will fit or be placed in contact with one another.

Figure 1:
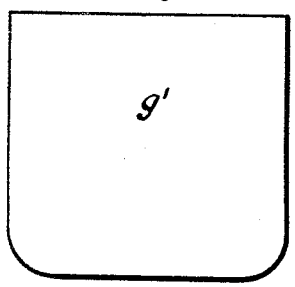
Figure 2:
Figure 5:
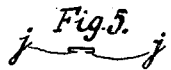
Figures 3, 4:
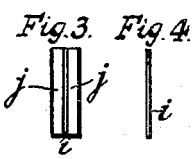
Figures 6, 7:
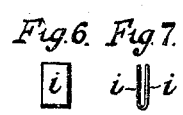
Figure 8:
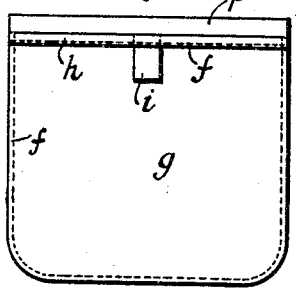
Figure 9:
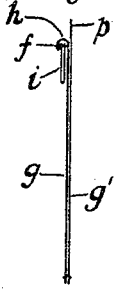
Figure 10:
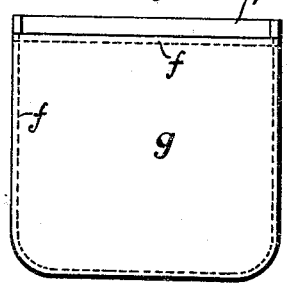
Fig. 10 is an elevation of the pocket after it has been turned inside-out and stitched a second time.
Figure 11:
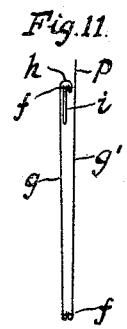
Fig. 11 is a sectional elevation of same.

The second pocket is formed of two blanks $g$, $g^1$ of any suitable woven or textile fabric, cut to the shape as shown at Fig. 1. Two of such blanks $g$, $g^1$ are employed to form a "bagged" pocket; one of such blanks is folded over on its top edge $h$,—as shown at Fig. 8,—and under the fold is inserted the button-hole strengthening piece $i$ which is formed out of a blank,—as shown at Fig. 2,—and its longitudinal edges are first folded over, as shown at $j$ (Figs. 3 and 5), and afterward the strengthening strip thus formed is folded over into the U-shape, as shown at Fig. 7. The upper edges of the blank $i$ are then secured under the folded portion $h$ of the pocket. The two blanks $g$, $g^1$ of the pocket are laid with their face sides inward, and then stitched together, as shown at Fig. 8, around the two sides and one end. Afterward the pocket is turned inside-out and with the button strengthening piece $i$ inside the pocket when the pocket will again be stitched around in the line of stitching $f$, as shown at Fig. 10. A "bagged" pocket is thus formed in the ordinary way, and will then be ready,—after the button-hole $k$ has been formed in the ordinary and usual way, and which secures the button strengthening piece $i$ in position,—for being fixed in position on the inside of the unlined garment.

Prior to inserting the "bagged" pocket in position the stay $l$ is cut in blank form from a piece of woven textile material, as shown at Fig. 12. In this invention the chief function of the stay $l$ is to provide means,—owing to the garment being unlined,—to which the second pocket can be attached; the strengthening of the opening of the pocket being a secondary matter. The stay is made of such a length as to pass at one end under the facing $b$, and to extend horizontally wholly across each front of the garment so as to be capable of being secured at its opposite end inside the side seam $m$ of the garment. The stay is first folded over at $n$ and $o$ (Figs. 13 and 14) on its upper and lower horizontal edges and is secured by a row of stitching $f$ by its lower edge $o$ to the inside of the front of the garment $a$, as shown at Figs. 15 and 16.

To insert the second or "hare" pocket in position on the inside of the garment the upper edge $p$ of the back portion $g^1$ of the pocket is folded over the upper edge $n$ of the horizontal stay $l$, and the two portions $l$ and $n$ are then stitched down along the upper edge, as shown at Figs. 20 to 22. After the second pocket has been sewn in position, and in order to strengthen the seam, a line of vertical felling $f^1$ is placed on each edge of the pocket for the width of the stay $l$.

$q$ is a button of ordinary construction which is arranged to pass through the button-hole $k$ for securing the mouth or orifice of the pocket.

It will readily be understood that the stay $l$ will strengthen the opening and fixing of the ordinary pocket $d$, and when, as at Fig. 25, the pockets $d$ and $g$ are both on the inside of the garment, then an opening is made through the stay in order to obtain an entrance into the pocket d.

r (Figs. 23 and 24) is an ordinary hook with which a soldier's tunic is usually provided.

The ordinary pocket d is first attached to the coat or other garment in the ordinary way, but to make its inner edge neat and tidy, seeing there is no lining, the said inner edge is also turned within the upper edge of the stay l and under the turned in upper edge of the second pocket, and the said edges of the two pockets are then stitched or felled together, as previously described.

At Figs. 20 to 29 are shown various methods of applying the herein described stay l and the pocket g to garments of various descriptions, such as, say, Figs. 20 to 22 where a single pocket is only employed and arranged on the inside as previously described.

At Figs. 23 to 25 are shown the two pockets both arranged on the inside of the tunic. In this arrangement the stay l is shown divided into two pieces, one above and one below the slit or opening in the fabric a. If desired a single stay piece l may be employed and the slit formed through the fabric and the stay being cut in the usual manner. In this arrangement the portions of the fabric in which the cut is formed are turned respectively upward and downward to form a neat edge and the flap e is placed on the inside of the fabric between it and the outer portion of the pocket d, and the portion $g^1$ of the second pocket is carried upward and passes over the upper folded edge of the stay. The inner portion of the pocket d is folded over on the top and attached to the turned over portion of the fabric that forms the lower edge of the slit. Entrance to the pocket d is made through the slit or opening in the fabric a while a separate and independent access to the second pocket is obtained from the inside of the garment.

At Figs. 26 and 27 is shown a bellows pocket d on the outside of the garment with the flap e attached also to the outside and its upper portion covered with a belt or facing s, the edge of the same being folded in as shown. On the inside of the garment is fixed the stay l with its top and bottom edges folded in and with the portion $g^1$ of the second pocket folded over the top portion of the stay and secured thereto by stitching, as previously described.

At Figs. 28 and 29 is shown a third method of attaching the two pockets to the inside of the garment. This arrangement is very similar to that shown at Figs. 23 to 25 only in this case one stay l is employed, and it is fixed to the upper portion of the fabric a above the opening or slit therein. The outer portion of the pocket d and the inner portion $g^1$ of the second pocket are folded over the upper edge of the stay l between the inner portion of the fabric a and the inner portion of the stay l and secured thereto by stitching, as previously described. Between the folded over portion of the fabric on the lower edge of the slit is inserted a lining or strengthening piece t. The entrance to the pocket d is made through the slit in the fabric a from the outside of the garment, but the separate entrance is made to the second pocket from the inside.

Other portions of the garments and the arrangement of pockets therein as illustrated at Figs. 20 to 29 but not particularly described, are similar to those described in connection with Figs. 1 to 19 of the accompanying drawings.

By the herein described means one or both of the unlined front portions of a coat or other garment can be provided on its inner side with an ordinary pocket, or bellows pocket, and with a second or an additional hare pocket to which separate access is obtained, the one from the outside of the coat or other garment, and the other from the inside of such garment. Or, when preferred, the second pocket alone can be used.

I would have it understood that if desired a pocket similar to the hare pocket, but smaller in construction, may be applied to the inside of waistcoats, as well as to coats, or tunics. Also that the hare pockets herein described may, if so desired, be provided with flaps by which the orifice of the pocket is closed.

What I claim is:—

1. In an unlined garment, the combination of the front of the garment and the vertical facing of the same, of a horizontal strengthening stay which extends from the facing of the front to the side seam of the garment, said strengthening piece being folded along its upper and lower edges and first sewed by its lower edge to the inside of the garment, and a pocket made of two blanks of fabric stitched together and secured in position by turning one of its upper edges over the upper folded edge of the strengthening pieces and sewing both of the two folded upper edges to the garment at the same time.

2. In an unlined garment having an outside pocket fixed thereto, combining therewith a second pocket on the inside of the garment, a horizontal strengthening stay extending wholly on the inside of the front of the garment between its facing and its side seam, said strengthening stay being turned over on its upper and lower edges, and the upper edge of the back portion of the second pocket being turned over the upper edge of the said stay and secured to the front of the garment simultaneously with the said upper edge of the stay, and sewn vertically thereto on each side of the second pocket, as described.

3. In an unlined garment having an outside pocket, a flap for covering the orifice of the pocket secured to the outside of the garment, a facing for the top edge of the flap, a horizontal stay turned over on its upper and lower edges and secured to the inside of the garment, a second pocket secured by its upper in-turned edge of its back portion to and between the upper edge of the said stay and the inside of the front of the garment, and sewn vertically to the stay on each side of the second pocket, as described.

FRED STURDY.

Witnesses:
W. FAIRBURN-HART,
ALICE M. TURNER.

Copies of this patent may be obtained for five cents each, by addressing the "Commissioner of Patents. Washington, D. C."